United States Patent [19]

Kohno et al.

[11] Patent Number: 4,898,434
[45] Date of Patent: Feb. 6, 1990

[54] BRAKE PRESSURE CONTROL DEVICE FOR VEHICLES

[75] Inventors: Teruhisa Kohno; Koichi Hashida; Koji Takata, all of Itami, Japan

[73] Assignee: Sumitomo Electric Industries, Ltd., Osaka, Japan

[21] Appl. No.: 264,442

[22] Filed: Oct. 25, 1988

Related U.S. Application Data

[62] Division of Ser. No. 115,450, Oct. 30, 1987, abandoned.

[30] Foreign Application Priority Data

Oct. 31, 1986 [JP] Japan ................. 61-261075

[51] Int. Cl.⁴ .................. B60T 8/02; B60T 8/36
[52] U.S. Cl. .................. 303/119; 303/113; 251/129.02; 251/129.19
[58] Field of Search .......... 303/119, 113, 115; 137/522, 523, 495, 508; 251/129.02, 129.19, 129.21

[56] References Cited

U.S. PATENT DOCUMENTS

| | | | |
|---|---|---|---|
| 3,617,098 | 11/1971 | Leiber | 303/68 |
| 4,166,657 | 9/1979 | Blomberg et al. | 303/119 |
| 4,462,642 | 7/1984 | Leiber | 303/119 |
| 4,557,527 | 12/1985 | Stumpe | 303/119 |
| 4,571,010 | 2/1986 | Dittner et al. | 303/119 |
| 4,722,576 | 2/1988 | Matsuda | 303/119 |

OTHER PUBLICATIONS

Japanese Patent Laying-Open Gazette No. 202142/1983, pp. 239 to 242, Laying open date: Nov. 25, 1983.

*Primary Examiner*—Douglas C. Butler
*Assistant Examiner*—Mark T. Le
*Attorney, Agent, or Firm*—W. G. Fasse; D. H. Kane, Jr.

[57] ABSTRACT

A brake pressure control device for vehicles is provided in a pipeline connecting a master cylinder (22) and a wheel brake (23) with an electromagnetic directional control valve (24) which is switched in a plurality of valve positions by electromagnetic force. The electromagnetic directional control valve (24) is switched between a first valve position and a second valve position. Bidirectional flow of fluid is allowed when the electromagnetic directional control valve is in the first valve position. Unidirectional flow of the fluid is allowed but reverse flow of the fluid is prevented when the electromagnetic directional control valve is in the second valve position.

6 Claims, 9 Drawing Sheets

BRAKE PRESSURE CONTROL DEVICE FOR VEHICLES

This is a Divisional of application Ser. No.: 115,450 (abandoned) filed: Oct. 30, 1987.

BACKGROUND OF THE INVENTION

1. Field of the Invention

The present invention relates to a brake pressure control device for vehicles for controlling the brake pressure to provide, e.g. an antilocking function, a traction control, an automatic brake control for a vehicle-to-vehicle distance control, an automatic brake control for an obstacle avoidance, etc.

2. Description of the Prior Art

As the simplest method of controlling brake pressure for antilocking control, traction control, automatic brake control for vehicle-to-vehicle distance control, automatic brake control for obstacle avoidance etc., it is well known to provide an electromagnetic directional control valve, which is switched in a plurality of positions by an electromagnetic force, in a pipeline connecting a master cylinder and a wheel brake. A typical brake pressure control device for an antilocking control is disclosed in U.S. Pat. No. 3,617,098, for example. Present FIG. 1 is a hydraulic pressure circuit diagram of the brake pressure control device as disclosed in U.S. Pat. No. 3,617,098.

Referring to FIG. 1, an electromagnetic directional control valve 4, which is switched between two positions by an electromagnetic force, arranged in a pipeline connecting a master cylinder 2 for converting an operating force of a brake pedal 1 into a hydraulic pressure for a wheel brake 3. An auxiliary power circuit 5 is connected in parallel with the electromagnetic directional control valve 4. A pump 7 is arranged in the auxiliary power circuit 5, to be driven by a motor 6. An electromagnetic directional control valve 8, which is switched between two positions by an electromagnetic force, and a reservoir 9 are further arranged in the auxiliary power circuit 5, as shown in FIG. 1. A check valve 10 is connected in a circuit 11 which is arranged in parallel with the electromagnetic directional control valve 4. The check valve 10 allows flow of fluid from the wheel brake 3 to the master cylinder 2, while preventing reverse flow of the fluid.

It is assumed here that an antilocking signal is generated when the brake pedal 1 is operated in the hydraulic pressure circuit as shown in FIG. 1. The positions of the electromagnetic directional control valves 4 and 8 are suitably switched by the signal. Pressure against the wheel brake 3 is reduced when both of the electromagnetic directional control valves 4 and 8 are energized and retained when only the electromagnetic directional control valve 4 is energized, while being increased when the electromagnetic directional control valves 4 and 8 are not energized. Under such antilocking control, the pressure against the wheel brake 3 is controlled to be lower than that of the master cylinder 2. However, when the driver relaxes the operating force against the brake pedal 1 for relaxing the braking force during the control, the brake pressure must be lowered responsively. The check valve 10 is provided in order to satisfy such requirement. If, for example, the operating force against the brake pedal 1 is relaxed when the electromagnetic directional control valve 4 is energized, the pressure of the master cylinder 2 becomes lower than that against the wheel brake 3, whereby the fluid passes through the check valve 10 to flow toward the master cylinder 2. Thus, the brake pressure against the wheel brake 3 is also lowered in response to relaxation of the operating force by the brake pedal 1.

In case where the brake pedal 1 is not operated in an automatic brake control for a traction control or vehicle-to-vehicle distance control, for example, the pressure against the wheel brake 3 must be increased when the driver should operate the brake pedal 1 the pressure against the wheel brake 3 is higher than the automatic control pressure. Such an operation is required in a quick braking action of the beginning of a traction control, for example. In order to satisfy such a requirement, it is necessary to provide another check valve, which is effective in a direction opposite to that of the check valve 10, in the hydraulic pressure circuit as shown in FIG. 1. The newly provided check valve is adapted to allow flow of the fluid from the master cylinder 2 to the wheel brake 3 while preventing a reverse flow. When the brake pedal 1 is operated in such circuit structure, the pressure against the wheel brake 3 is also increased responsively.

A device not employing any check valve is also proposed in the art as a system for varying the pressure against a wheel brake with a change in the operating force of a brake pedal during an antilocking control or a traction control. In U.S. Pat. No. 4,462,642, hydraulic pressure sensors are arranged in front and at the back of a cutoff valve, which is connected in a pipeline connecting a master cylinder and a wheel brake, to compare hydraulic pressure levels on both sides of the cutoff valve with each other whereby the operation of the cutoff valve is controlled in response to the hydraulic pressure levels.

In the brake pressure control device as shown in FIG. 1, the check valve 10 must be connected in parallel with the electromagnetic directional control valve 4. Thus, the circuit structure and pipe arrangement are complicated, leading to economic loss and reduced reliability.

Japanese Patent Laying-Open Gazette No. 202142/1983 also discloses a brake pressure control device having a check valve connected in parallel with an electromagnetic directional control valve. This brake pressure control device is also complicated in its circuit structure, similarly to the brake pressure control device of U.S. Pat. No. 3,617,098 as shown in FIG. 1.

In particular, a rather complicated circuit structure is required in order to vary the pressure against the wheel brake in response to a change in the operating force of the brake pedal when an antilocking control is performed while the brake pedal is being operated and when a traction control performed while the brake pedal is not being operated.

Further, when hydraulic pressure sensors are provided on both sides of a cutoff valve as in the brake pressure control device disclosed in U.S. Pat. No. 4,462,642, the total cost of the entire device is increased since the hydraulic sensors etc. are expensive.

SUMMARY OF THE INVENTION

The present invention has been proposed in view of the above circumstances, it is an object of the invention to provide a brake pressure control device with a simple circuit structure, in which brake pressure against a wheel brake can be changed in response to a change in the hydraulic pressure of a master cylinder when a brake pedal is operated an antilocking control etc. or when the brake pedal is not operated in a traction control etc. Preferably, the present invention is directed to implement a brake pressure control device that is applicable to an antilocking control and a traction control and which has a simple structure, in which the brake pressure against a wheel brake can be changed in response to a change in the change in the hydraulic pressure of a master cylinder in an antilocking control situations and in traction control.

The present invention is directed to a brake pressure control device for vehicles, which is provided with an electromagnetic directional control valve switchable in a plurality of valve positions by an electromagnetic force in a pipeline connecting a master cylinder and a wheel brake. The feature of the present invention resides in that the electromagnetic directional control valve itself has a valve position for allowing only unidirectional flow of fluid while preventing a reverse flow.

According to the present invention, a check valve is not fixedly provided in a pipeline as in the conventional case but selectively positioned in the pipeline or outside the pipeline by an electromagnetic force, whereby the entire circuit structure and pipe arrangement are simplified to improve the system's reliability while also reducing its costs. When it is necessary to change the brake pressure against a wheel brake following a change in the master cylinder pressure in an antilocking control or in a traction control etc., an electromagnetic directional control valve may be driven to locate the check valve in the pipeline.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
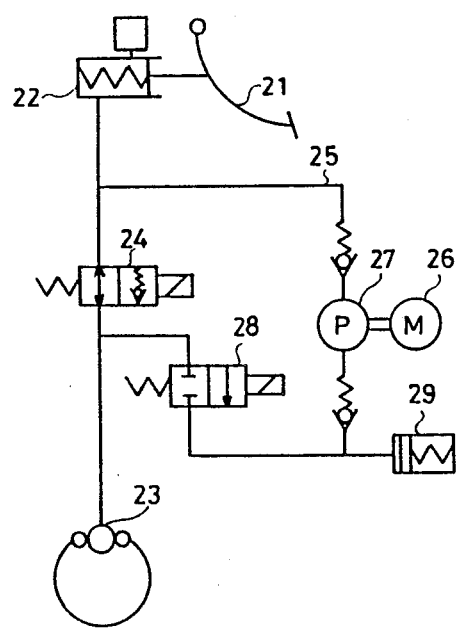
FIG. 2 is a hydraulic pressure circuit diagram of a first embodiment according to the present invention.

FIG. 2 is a hydraulic pressure circuit diagram showing a first embodiment of the present invention. An electromagnetic directional control valve 24 is provided in a pipeline connecting a master cylinder 22 with a wheel brake 23. The master cylinder converts an operating force applied by a brake pedal 21 into hydraulic pressure for application to the wheel brake 23. This electromagnetic directional control valve 24 is switched between a first valve position and a second valve position by electromagnetic force. Bidirectional flow of fluid is allowed when the electromagnetic directional control valve 24 is in the first valve position as shown in FIG. 2. On the other hand, flow of the fluid from the wheel brake 23 to the master cylinder 22 is allowed but reverse flow is prevented when the electromagnetic directional control valve 24 is switched to the second valve position.

An auxiliary power circuit 25, which is connected in parallel with the electromagnetic directional control valve 24, is provided therein with a pump 27 driven by a motor 26, an electromagnetic directional control valve 28 and a reservoir 29.

In order to perform a general brake operation by the brake pedal 21 or re-pressurization in an antilocking control, the electromagnetic directional control valve 24 is brought into the first valve position as shown in FIG. 2. On the other hand, the electromagnetic directional control valve 24 is energized to bring the same into the second valve position, in order to reduce or retain a brake pressure against the wheel brake 23 in an antilocking control operation. In this case, the operating force applied by the brake pedal 21 is so relaxed that the hydraulic pressure of the master cylinder 22 is lower than the brake pressure against the wheel brake 23, whereby the fluid flows through the electromagnetic directional control valve 24. Namely, the brake pressure against the wheel brake 23 is lowered following a reduction in the hydraulic pressure of the master cylinder 22.

Figure 3:
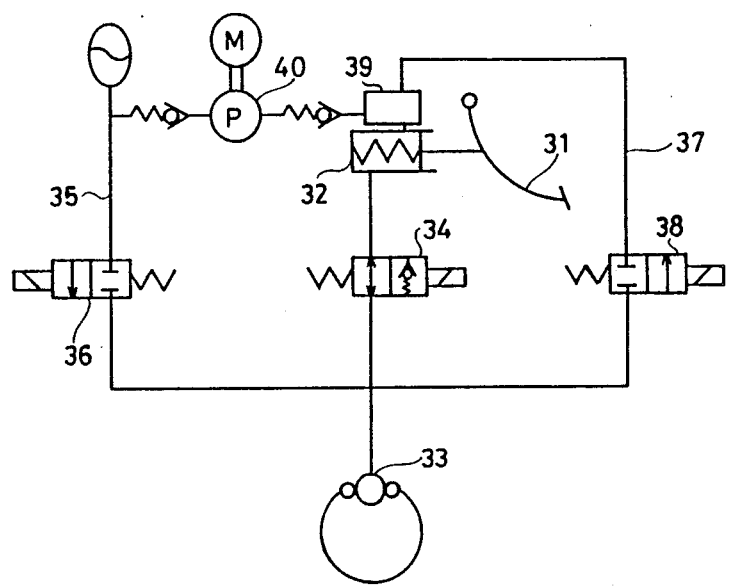
FIG. 3 is a hydraulic pressure circuit diagram of a second embodiment according to the present invention.

FIG. 3 is a hydraulic pressure circuit diagram showing a second embodiment according to the present invention.

An electromagnetic directional control valve 34 is provided in a pipeline connecting a master cylinder 32 for converting an operating force applied by a brake pedal 31, into hydraulic pressure to a wheel brake 33. The electromagnetic directional control valve 34 is switched between first and second valve positions by an electromagnetic force. Bidirectional flow of fluid is allowed when the electromagnetic directional control valve 34 is in the first valve position as shown in FIG. 3. On the other hand, flow of the fluid from the master cylinder 32 to the wheel brake 33 is allowed but reverse flow is prevented when the electromagnetic directional control valve 34 is brought into the second valve position. An auxiliary power circuit 35 is provided in parallel with the electromagnetic directional control valve 34. The auxiliary power circuit includes an electromagnetic directional control valve 36. A pump 40 in the auxiliary power circuit 34 sucks working fluid from a reservoir 39 to pressurize the circuit 34. As shown in FIG. 3, an electromagnetic directional control valve 38 is provided in a drain circuit 37 which communicates with the reservoir 39.

In order to perform an automatic brake control for a traction control or a stop retention, for example, the electromagnetic directional control valve 34 is brought into the second valve position. When a brake pedal 31 is operated in this state, hydraulic pressure in the master cylinder 32 exceeds the brake pressure against the wheel brake 33, whereby the fluid flows through the electromagnetic directional control valve 34. Thus, when the brake pedal 31 is operated for a traction control or for an automatic brake control, the brake pressure against the wheel brake 33 is increased responsively.

Figure 4:
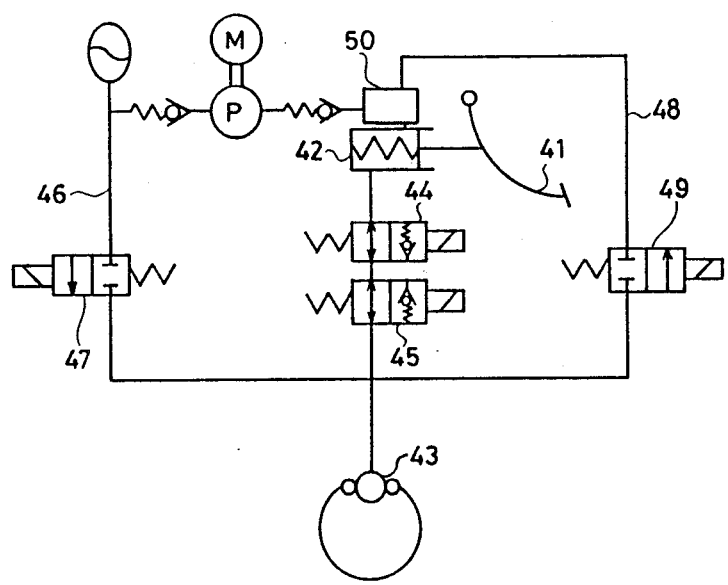
FIG. 4 is a hydraulic pressure circuit diagram of a third embodiment according to the present invention.

FIG. 4 is a hydraulic pressure circuit diagram showing a third embodiment according to the present invention.

Two electromagnetic directional control valves 44 and 45 are connected in series in a pipeline connecting a master cylinder 42 for converting operating force by a brake pedal 41 into hydraulic pressure to a wheel brake 43. The electromagnetic directional control valve 44 is switched between a first valve position for allowing a bidirectional flow of fluid and a second valve position for allowing a flow of the fluid from the wheel brake 43 to the master cylinder 42 while preventing reverse flow. The other electromagnetic directional control valve 45 is switched between a first valve position for allowing a bidirectional flow of the fluid and a second valve position for allowing a flow of the fluid from the master cylinder 42 to the wheel brake 43 while preventing a reverse flow.

An auxiliary power circuit 46, which sucks working fluid from a reservoir 50 to pressurize the same, is provided with an electromagnetic directional control valve 47. As shown in FIG. 4, an electromagnetic directional control valve 49 in a drain circuit 48 communicates with the reservoir 50.

In order to perform a general brake operation by the brake pedal 41, both of the electromagnetic directional control valves 44 and 45 are brought into the first valve positions as shown in FIG. 4.

In order to perform antilocking control with the brake pedal 41 being operated, the electromagnetic directional control valve 44 is energized to bring the same into the second valve position. In this case, the other electromagnetic directional control valve 45 is in the first valve position as shown in FIG. 4. When the operating force applied by the brake pedal 41 is relaxed in this state, the fluid acting on the wheel brake 43 passes through the electromagnetic directional control valves 45 and 44 to flow toward the master cylinder 42. Thus, the brake pressure against the wheel brake 43 is reduced following a relaxation of applied by the operating force of the brake pedal 41.

In order to perform a traction control etc. in a state when the brake pedal 41 is not operated, the electromagnetic directional control valve 45 is energized to bring the same into the second valve position. In this case, the electromagnetic directional control valve 44 is in the first valve position as shown in FIG. 4. When the brake pedal 41 is operated in this state, the fluid delivered from the master cylinder 42 passes through the electromagnetic directional control valves 44 and 45 to flow toward the wheel brake 43. During such traction control etc., the brake pressure against the wheel brake 43 is increased following an increase in the hydraulic pressure of the master cylinder 42.

Figure 5:
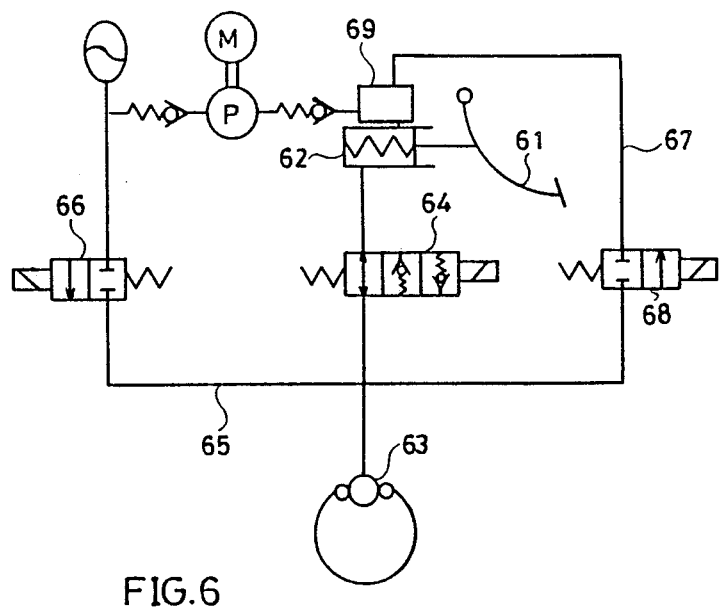
FIG. 5 is a hydraulic pressure circuit diagram of a fourth embodiment according to the present invention.

FIG. 5 is a hydraulic pressure circuit diagram showing a fourth embodiment according to the present invention.

An electromagnetic directional control valve 64, which is switchable into any one of three positions by electromagnetic force, is arranged in a pipeline connecting a master cylinder 62 for converting an operating force applied by a brake pedal 61 into a hydraulic pressure and a wheel brake 63. Bidirectional flow of fluid is allowed when the electromagnetic directional control valve 64 is in a first valve position as shown in FIG. 5. Flow of the fluid from the master cylinder 62 to the wheel brake 63 is allowed but a reverse flow is prevented when the electromagnetic directional control valve 64 is brought into a second valve position. Further, flow of the fluid from the wheel brake 63 to the master cylinder 62 is allowed but a reverse flow is prevented when the electromagnetic directional control valve 64 is switched to a third valve position.

An auxiliary power circuit 65, which sucks working fluid from a reservoir 69 to pressurize circuit 65, is provided with an electromagnetic directional control valve 66. An electromagnetic directional control valve 68 is provided in a drain circuit 67, which communicates with the reservoir 69.

In order to perform a general brake operation, the electromagnetic directional control valve 64 is brought into the first valve position as shown in FIG. 5.

In order to perform an antilocking control when the brake pedal 61 is operated, the electromagnetic directional control valve 64 is brought into the third valve position. When the operating force of the brake pedal 61 is relaxed in this state, the fluid acting on the wheel brake 63 passes through the electromagnetic directional control valve 64 to flow toward the master cylinder 62. Thus, the brake pressure against the wheel brake 63 is reduced following relaxation of the operating force of the brake pedal 61.

In order to perform a traction control etc. when the brake pedal 61 is not operated, the electromagnetic directional control valve 64 is brought into the second valve position. When the brake pedal 61 is operated in this state, the fluid delivered from the master cylinder 62 passes through the electromagnetic directional control valve 64 to flow toward the wheel brake 63. When the brake pedal 61 is thus operated during the traction control etc., the brake pressure against the wheel brake 63 is increased responsively.

Figure 6:
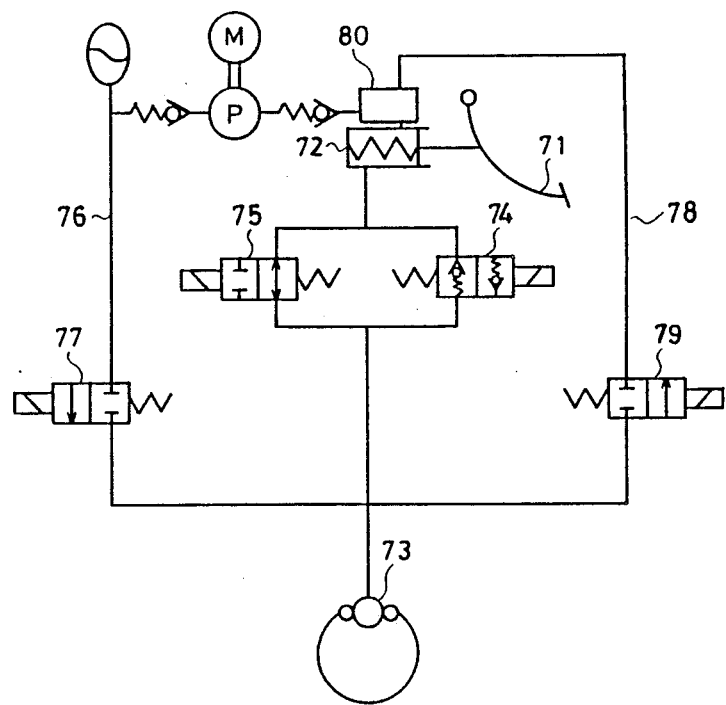
FIG. 6 is a hydraulic pressure diagram of a fifth embodiment according to the present invention.

FIG. 6 is a hydraulic pressure circuit diagram showing a fifth embodiment according to the present invention.

An electromagnetic directional control valve 74, which is switchable between first and second valve positions, is arranged in a pipeline connecting a master cylinder 72 for converting as operating force into a hydraulic pressure, with a wheel brake 73. Flow of fluid from the master cylinder 72 to the wheel brake 73 is allowed but a reverse flow is prevented when the electromagnetic directional control valve 74 is in the first valve position as shown in FIG. 4. On the other hand, flow of the fluid from the wheel brake 73 to the master cylinder 72 is allowed but reverse flow is prevented when the electromagnetic directional control valve 74 is brought into the second valve position.

As shown in FIG. 6, a directional control valve 75, which is switched between two positions by an electromagnetic force, is connected in parallel with the electromagnetic directional control valve 74. This directional control valve 75 allows a bidirectional flow of the fluid when the same is in a first valve position as shown in FIG. 6. The directional control valve 75 is brought into a second valve position to prevent the bidirectional flow of the fluid.

An auxiliary power circuit 76, which sucks working fluid from a reservoir 80 to pressurize the circuit 76 has an electromagnetic directional control valve 77. An electromagnetic directional control valve 79 is arranged in a drain circuit 78, which communicates with the reservoir 80.

In order to perform a general brake operation, the electromagnetic directional control valve 74 is brought into the first valve position and the directional control valve 75 is also brought into the first valve position, as shown in FIG. 6.

In order to perform an antilocking control etc. when the brake pedal 71 is operated, the electromagnetic directional control valve 74 is brought into the second valve position and the directional control valve 75 is also brought into the second valve position. When the operating force applied by the brake pedal 71 is relaxed in this state, the fluid acting on the wheel brake 73 passes through the electromagnetic directional control valve 74 and flows toward the master cylinder 72. When the operating force of the brake pedal 71 is as thus relaxed in antilocking control etc., the brake pressure against the wheel brake 73 is reduced responsively.

In order to perform a traction control etc. when the brake pedal 71 is not operated, the electromagnetic directional control valve 74 is brought into the first valve position and the directional control valve 75 is brought into the second valve position. When the brake pedal 71 is operated in this state, the fluid delivered from the master cylinder 72 passes through the electromagnetic directional control valve 74 to flow toward the wheel brake 73. Thus, the brake pressure against the wheel brake 73 is increased following an increase in the operating force applied the brake pedal 71.

Figure 7:
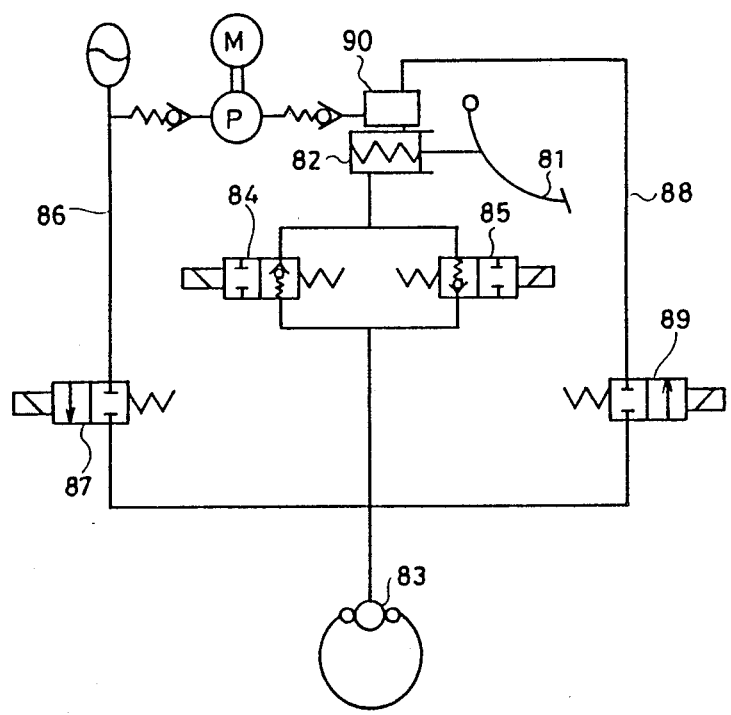
FIG. 7 is a hydraulic pressure circuit diagram of a sixth embodiment according to the present invention.

FIG. 7 is a hydraulic pressure circuit diagram showing a sixth embodiment according to the present invention.

Two electromagnetic directional control valves 84 and 85 are connected in parallel in a pipeline connecting a master cylinder 82 for converting an operating force of a brake pedal 81 into hydraulic pressure to a wheel brake 83. The electromagnetic directional control valve 84 is switched between a first valve position for allowing a flow of fluid from the master cylinder 82 to the wheel brake 83 while preventing a reverse flow and a second valve position for preventing a bidirectional flow of the fluid. The other electromagnetic directional control valve 85 is switched between a first valve position for allowing a flow of the fluid from the wheel brake 83 to the master cylinder 82 while preventing a reverse flow, and a second valve position for preventing bidirectional flow of the fluid.

An auxiliary power circuit 86, which sucks working fluid from a reservoir 90 to pressurize the circuit 86 has an electromagnetic directional control valve 87. An electromagnetic directional control valve 89 is provided in a drain circuit 88, which communicates with the reservoir 90.

In order to perform a general brake operation, the electromagnetic directional control valve 84 is brought into the first valve position as shown in FIG. 7, and the other electromagnetic directional control valve 85 is also brought into the first valve position as shown in FIG. 7.

In order to perform an antilocking control, the electromagnetic directional control valve 84 is brought into the second valve position while the other electromagnetic directional control valve 85 is brought into the first valve position. When the operating force applied by the brake pedal 81 is relaxed in this state, the fluid acting on the wheel brake 83 flows through the electromagnetic directional control valve 85. Thus, the brake pressure against the wheel brake 83 is reduced following a relaxation of the operating force of applied by the brake pedal 81.

In order to perform a traction control etc., the electromagnetic directional control valve 84 is brought into the first valve position and the other electromagnetic directional control valve 85 is brought into the second valve position. When the brake pedal 81 is operated in this state, the fluid delivered from the master cylinder 82 flows through the electromagnetic directional control valve 84. Thus, the brake pressure against the wheel brake 83 is increased following an increase in the operating force applied by the brake pedal 81.

Figure 8:
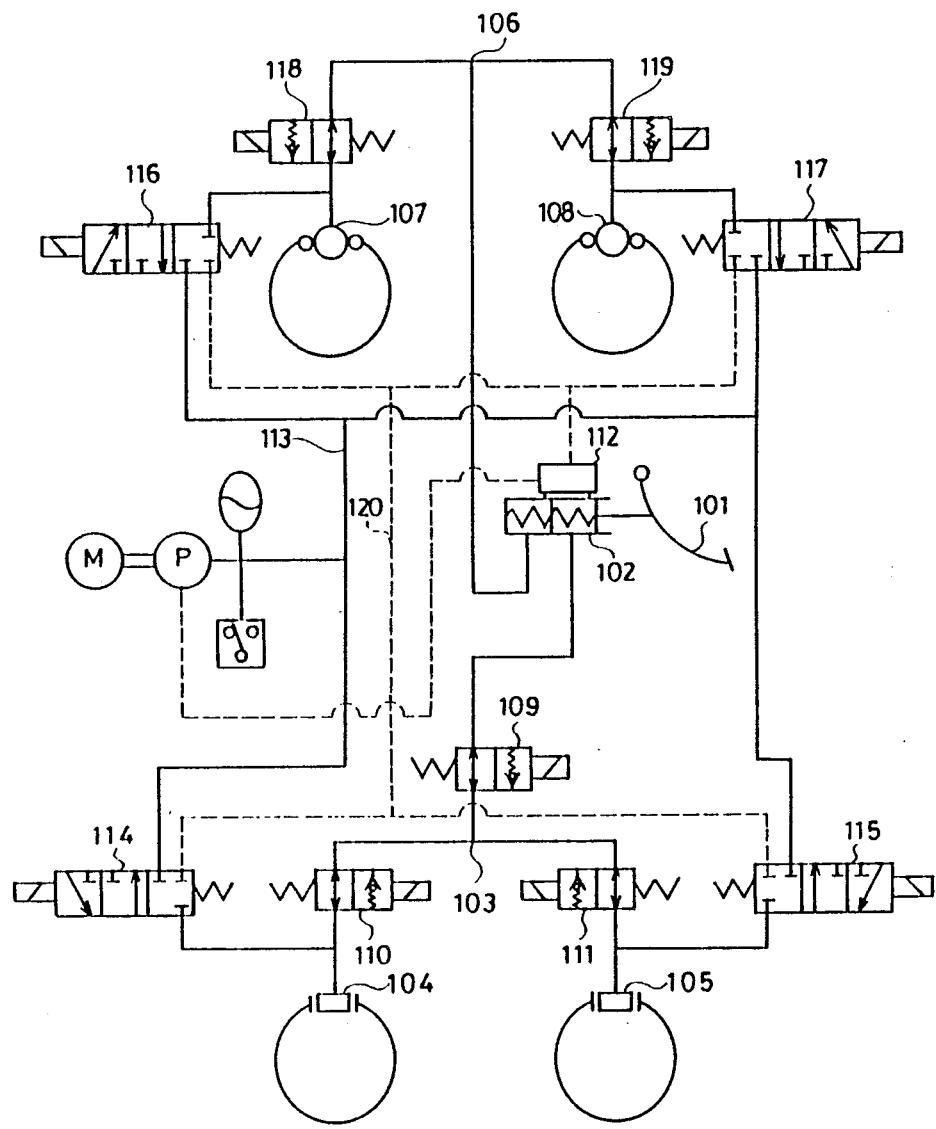
FIG. 8 is a hydraulic pressure circuit diagram showing an example in which the present invention is applied to an FR car.

FIG. 8 is a hydraulic pressure circuit diagram showing such an example that the present invention is applied to an FR car.

A master cylinder 102 for converting an operating force applied by a brake pedal 101, into a hydraulic pressure includes a tandem master cylinder. A first pressurized chamber of the master cylinder 102 communicates through a junction 103 with wheel brakes 104 and 105 for the left and right rear wheels, which are driving wheels. A second pressurized chamber of the master cylinder 102 communicates through a junction 106 with wheel brakes 107 and 108 for the left and right front wheels, which are driven wheels.

An electromagnetic directional control valve 109, which is switched between a first valve position for allowing a bidirectional flow of fluid and a second valve position for allowing a flow of the fluid from the junction 103 to the master cylinder 102 while preventing a reverse flow, is arranged in a pipeline between the first pressurized chamber of the master cylinder 102 and the junction 103. Further, electromagnetic directional control valves 110 and 111, each of which is switchable between a first valve position for allowing a bidirectional flow of the fluid and a second position for allowing a flow of the fluid from the junction 103 to the wheel brake 104 or 105 while preventing reverse flow, are provided in the pipeline between the junction 103 and the wheel brakes 104 and 105 for the left and right rear wheels.

Electromagnetic directional control valves 118 and 119, each of which is switched between a first valve position for allowing a bidirectional flow of the fluid and a second position for allowing a flow of the fluid from the wheel brake 107 or 108 to the junction 106 while preventing reverse flow, are provided in the pipelines between the junction 106 and the wheel brakes 107 and 108 for the left and right front wheels.

An auxiliary power circuit 113, which sucks working fluid from a reservoir 112 to pressurize the circuit 113, communicates with the respective wheel brakes 104, 105, 107 and 108, and electromagnetic directional control valves 114, 115, 116 and 117 are arranged in the pipelines connecting the auxiliary power circuit 113 with the respective wheel brakes 104, 105, 107 and 108. The electromagnetic directional control valves 114, 115, 116 and 117 communicate with the reservoir 112 through a drain circuit 120.

In order to perform a general brake operation by operating the brake pedal 101, the electromagnetic directional control valves 109, 110, 111, 118 and 119 are brought into the first valve positions as shown in FIG. 8 respectively.

In order to perform an antilocking control when the brake pedal 101 is operated, the electromagnetic directional control valves 109, 118 and 119 are brought into the second valve positions while the remaining electromagnetic directional control valves 110 and 111 are brought into the first valve positions as shown in FIG. 8. When the operating force of the brake pedal 101 is relaxed in this state, the fluid acting on the wheel brakes 104, 105, 107 and 108 flows toward the master cylinder 101. Consequently, the brake pressure acting upon each of the wheel brakes 104, 105, 107 and 108 is reduced.

In order to perform a traction control when the brake pedal 101 is not operated, the electromagnetic directional control valves 109, 118 and 119 are brought into the first valve positions as shown in FIG. 8, while the remaining electromagnetic directional control valves 110 and 111 are brought into the second valve positions. When the brake pedal 101 is operated in this state, the brake pressure applied to the wheel brakes 104 and 105 for the left and right rear wheels, which are driving wheels, is increased.

Figure 9:
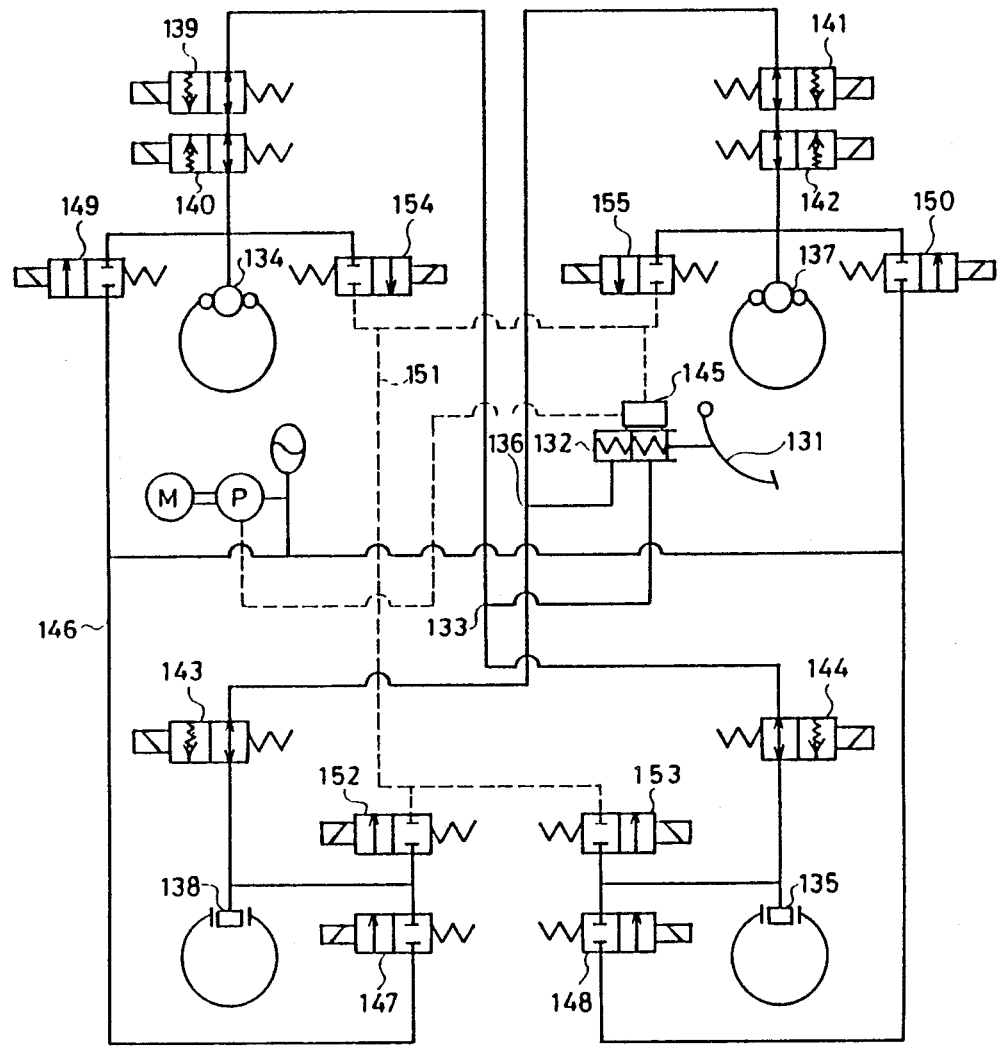
FIG. 9 is a hydraulic pressure circuit diagram showing an example in which the present invention is applied to an FF car.

FIG. 9 is a hydraulic pressure circuit diagram showing such an example that the present invention is applied to diagonal split piping suitable for an FF car.

In this example, a master cylinder 132 for converting an operating force applied by a brake pedal 131 into hydraulic pressure is prepared by a tandem master cylinder. A first pressurized chamber of the master cylinder 132 communicates through a junction 133 with a wheel brake 134 for a left front wheel, which is a driving wheel, and a wheel brake 135 for a right rear wheel, which is a driven wheel. A second pressurized chamber of the master cylinder 132 communicates through a junction 136 with a wheel brake 137 for a right front wheel, which is a driving wheel, and a wheel brake 138 for a left rear wheel, which is a driven wheel.

A pair of electromagnetic directional control valves 139 and 140 and another pair of electromagnetic directional control valves 141 and 142, are arranged in series in the pipelines between the junction 133 and the wheel brake 134 for the left front wheel and between the junction 136 and the wheel brake 137 for the right front wheel. Each of the electromagnetic directional control valves 139 and 141 is switched between a first valve position for allowing a bidirectional flow of fluid and a second valve position for allowing a flow of the fluid from the wheel brake 134 or 137 to the junction 133 or 136 while preventing a reverse flow of the fluid. Each of the remaining electromagnetic directional control valves 140 and 142 is switchable between a first valve position for allowing a bidirectional flow of the fluid and a second valve position for allowing a flow of the fluid from the junction 133 or 136 to the wheel brake 134 or 137 while preventing a reverse flow.

Electromagnetic directional control valves 144 and 143, each of which is switched between a first valve position for allowing bidirectional flow of the fluid and a second valve position for allowing flow of the fluid from the wheel brake 135 or 138 to the junction 133 or 136 while preventing reverse flow, are connected in the pipelines between the junction 133 and the wheel brake 135 for the right rear wheel and between the junction 136 and the wheel brake 138 for the left rear wheel respectively.

An auxiliary power circuit 146, which sucks working fluid from a reservoir 145 to pressurize the same, circuit 146 communicates with the respective wheel brakes 138, 135, 134 and 137, and electromagnetic directional control valves 147, 148, 149 and 150 are connected in pipelines connecting the auxiliary power circuit 146 with the wheel brakes 138, 135, 134 and 137 respectively. Electromagnetic directional control valves 154, 155, 152 and 153 are connected in a drain circuit 151, which connects the respective wheel brakes 134, 137, 138 and 135 with the reservoir 145.

In order to perform a general brake operation by operating the brake pedal 131, the electromagnetic directional control valves 139, 140, 141, 142, 143 and 144 are brought into the first valve positions as shown in FIG. 9, respectively.

In order to perform an antilocking control when the brake pedal 131 is operated, the electromagnetic directional control valves 139, 141, 143 and 144 are brought into the second valve positions and the electromagnetic directional control valves 140 and 142 are brought into the first valve positions as shown in FIG. 9. When the operating force of the brake pedal 131 is relaxed in this state. The brake pressure applied to each wheel brake is reduced.

In order to perform a traction control in a state when the brake pedal 131 is not operated, the electromagnetic directional control valves 140 and 142 are brought into the second valve positions and the electromagnetic directional control valves 139, 141, 143 and 144 are brought into the first valve positions as shown in FIG. 9. When the brake pedal 131 is operated in this state, the brake pressure applied to each wheel brake is increased.

The electromagnetic directional control valve 64 as shown in FIG. 4 may be provided in the pipeline connecting the wheel brake for each driving wheel and the master cylinder, although the same is not shown in FIG. 9. Further, the electromagnetic directional control valve 74 and the directional control valve 75 as shown in FIG. 6 may be provided in the pipeline connecting the wheel brake for each driving wheel and the master cylinder.

Figure 1:
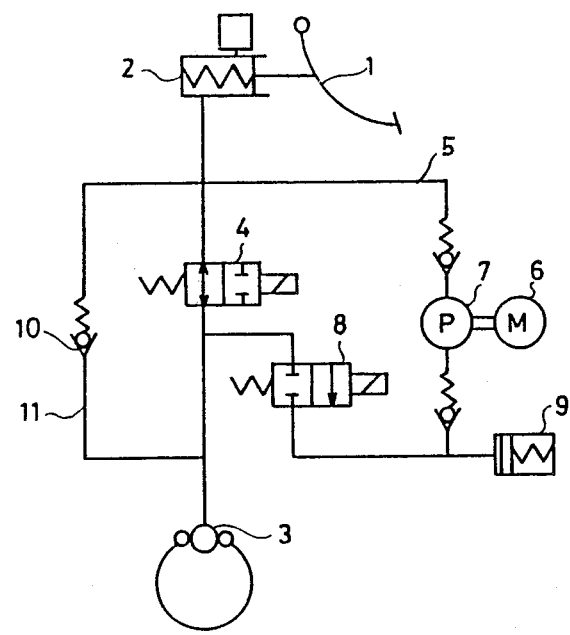
FIG. 1 is a hydraulic pressure circuit diagram of a brake pressure control device as shown in U.S. Pat. No. 3,617,098.
Figure 10A:
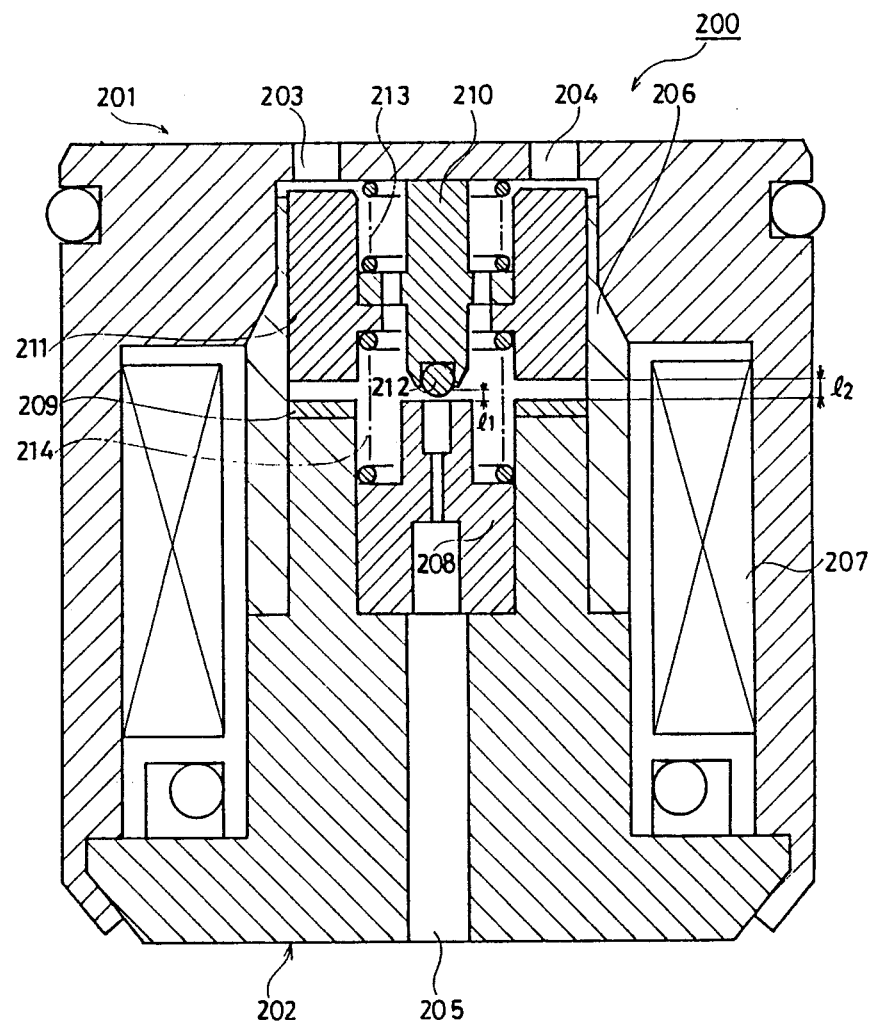
FIGS. 10A and 10B are sectional views showing the structure of an electromagnetic directional control valve 24 or 34 symbolically shown in FIG. 2 or 3, with FIG. 10A showing a state in which a coil is fed with no electricity and FIG. 10B showing a state in which the coil is fed with electricity.
Figure 10B:
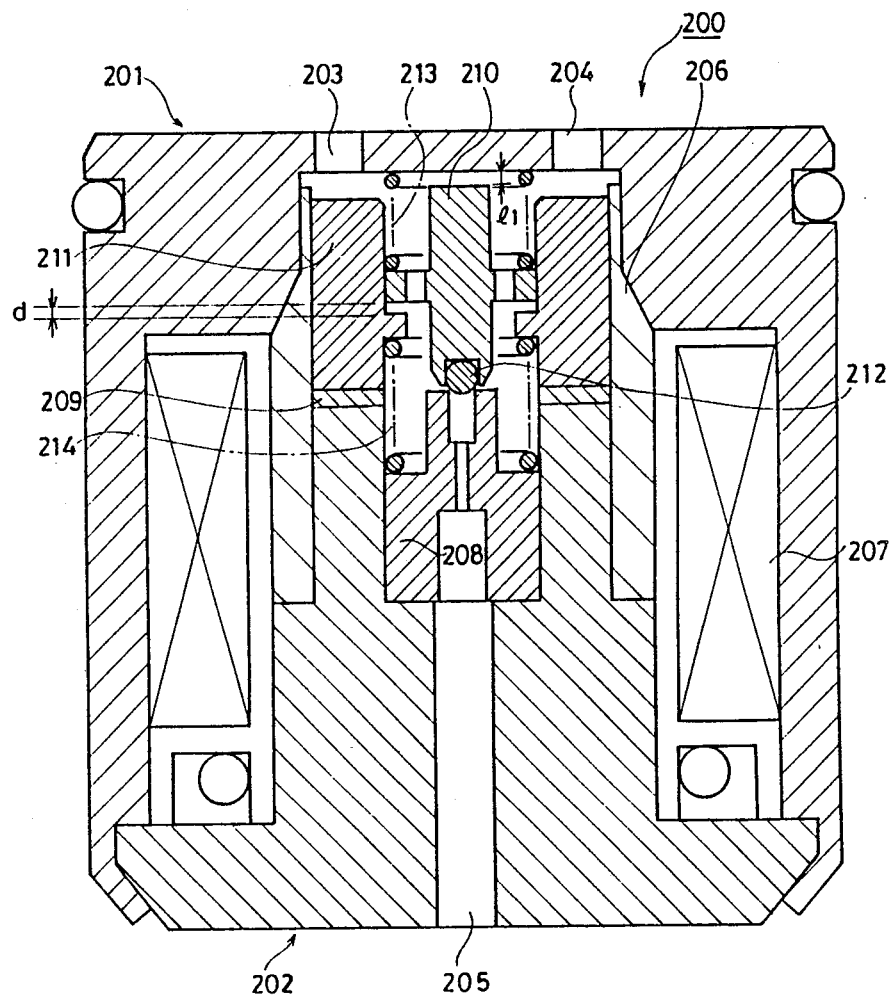

FIGS. 10A and 10B are illustrative of a concrete example of the electromagnetic directional control valve 24 as shown in FIG. 1 or the electromagnetic directional control valve 34 as shown in FIG. 2. An electromagnetic directional control valve 200 shown in FIGS. 10A and 10B figures is provided with a frame 201 and a stator 202 which is fixedly mounted in the frame 201. The frame 201 has ports 203 and 204, and the stator 202 has a port 205. A guide ring 206 of non-magnetic material is fixedly mounted around an upper part of the stator 202. Liquid tightness is maintained between the guide ring 206 and the frame 201. A coil 207 is provided around the stator 206, as shown in the figures.

A fixed valve seat 208 is press-fitted into the upper portion of the stator 202. An armature 211, which can be attracted toward the stator 202 by electromagnetic force, and a member 210 are contained in a space between the stator 202 and the frame 201. The member 210 is provided in its lower end portion with a globe valve portion 212, which is brought into contact with the fixed valve seat 208 to close a passage. As shown in FIGS. 10A and 10B, a shim 209 of non-magnetic material is fixedly mounted on an upper end portion of the stator 202, to adjust a clearance between the stator 202 and the armature 211.

A return spring 214 is effective between the fixed valve seat 208 and the armature 211. This return spring 214 continuously urges the armature 211 to move upwardly. A relief spring 213 is effective between the member 210 and the frame 201, to continuously urge the member 210 thereby to downwardly move the same in FIGS. 10A and 10B. The spring force of the relief spring 213 is extremely small as compared with the return spring 214. Further, a movable distance $l_2$ of the armature 211 is larger than a movable distance $l_1$ of the member 210.

FIG. 10A shows a state in which the coil 207 is deenergized. FIG. 10B shows a state in which the coil 207 is energized. It is assumed here that the ports 203 and 204 of the frame 201 communicate with a master cylinder and the port 205 of the stator 202 communicates with a wheel brake. When the coil 207 is not energized as shown in FIG. 10A, the armature 211 is moved upwardly by the spring force of the return spring 214. The armature 211 is thus in contact with a flange portion of the member 210 thereby to move the same in an upward direction. The armature 211 and the member 210 are thus moved upwardly until an upper end portion of the member 210 contacts the frame 201. In the state as shown in FIG. 10A, in which the magnet coil 207 is not energized the globe valve portion 212 of the member 210 is in a position separated from the fixed valve seat 208. Therefore, flow of fluid from the master cylinder to the wheel brake is allowed and a reverse flow, i.e., flow of the fluid from the wheel brake to the master cylinder, is also allowed.

On the other hand, when the coil 207 is energized as shown in FIG. 10B, the armature 211 is attracted and moved toward the stator 202. This movement is performed until the armature 211 contacts the shim 209. The movement stroke of the armature 211 is rendered larger than that of the member 210. Therefore, when the member 210 is moved downwardly by the relief spring 213 so that the globe valve portion 212 contacts the fixed valve seat 208, a clearance $d$ ($=l_2-l_1$) is defined between the flange portions of the member 210 and the armature 211.

In the state as shown in FIG. 10B, a flow of the fluid from the wheel brake to the master cylinder, i.e., flow of the fluid from the port 205 to the ports 203 and 204 is allowed since the spring force of the relief spring 213 is weak. On the other hand, a reverse flow of the fluid, i.e., flow of the fluid from the ports 203 and 204 to the port 205 is prevented.

A brake pressure control device employing such an electromagnetic directional control valve as shown in FIGS. 10A and 10B simplifies the circuit structure and the pipe arrangement. However, the electromagnetic directional control valve as shown in FIGS. 10A and 10B can be further improved.

When the electromagnetic directional control valve is energized and the fluid in the armature 211 side, i.e., the fluid in the ports 203 and 204 is under a higher pressure than the fluid in the stator 202 side, i.e., the fluid in the port 205, the member 210 contacts the fixed valve seat 208 to hold it in a closed state. When the electromagnetic directional control valve is deenergized in the same fluid pressure relation, i.e., in the state wherein the fluid in the armature 211 side is retained at a high pressure level, the following conditions must be satisfied for separating the member 210 from the fixed valve seat 208 thereby to open the valve. The return spring 214 urges the member 210 in a valve-opening direction. On the other hand, the relief spring 213 and a hydraulic pressure force acting on the effective sealing areas of the member 210 and of the fixed valve seat 208, and a residual magnetic force urge the member 210 in a valve-closing direction. Therefore, even if the electromagnetic directional control valve is deenergized state, the member 210 is held in the closed unless the force urging the member 210 in the valve-opening direction exceeds the force urging the same in the valve-closing direction. Thus, a delay may be caused in the valve opening when the electromagnetic directional control valve is deenergized.

In order to reduce such valve opening delay in the aforementioned deenergized state, the spring force of the return spring 214 may be increased. In this case, however, a delay in the valve opening is increased when the electromagnetic directional control valve is energized. Thus, it is difficult to attain a quick response on both of the energized and deenergized states of the electromagnetic directional control valve as shown in FIGS. 10A and 10B.

Figure 11:
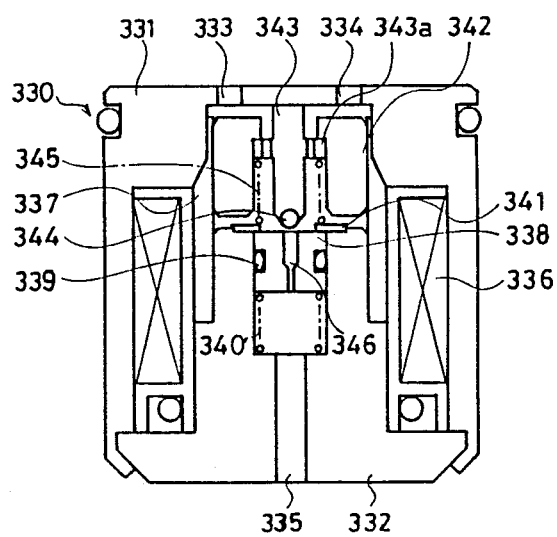
FIG. 11 is a sectional view showing another example of an electromagnetic directional control valve according to the present invention.
Figure 12:
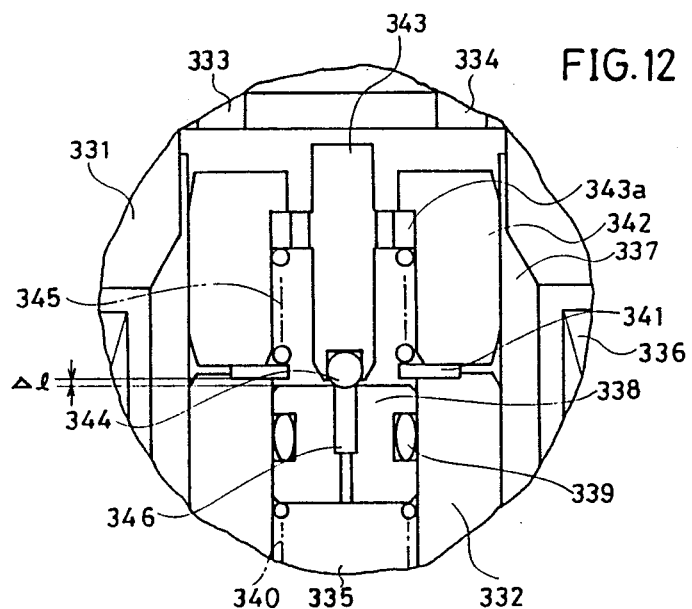
FIG. 12 is a partially enlarged sectional view of the electromagnetic directional control valve as shown in FIG. 11.

FIG. 11 is a sectional view showing an electromagnetic directional control valve which has an excellent quick response in both, the energized and in the deenergized states, and FIG. 12 is a partially enlarged sectional view thereof.

This electromagnetic directional control valve 330 has a frame 331 and a stator 332 which is fixedly engaged into the frame 331. The frame 331 is provided with ports 333 and 334, and the stator 332 is provided with an axially extending passage 335. In an exemplary application, the passage 335 of the stator 332 communicates with a master cylinder and the ports 333 and 334 of the frame 331 communicate with wheel brakes.

A guide ring 337 of non-magnetic material is fixedly press-fitted around an upper portion of the stator 332. Liquid tightness is maintained between the guide ring 337 and the stator 332 as well as between the guide ring 337 and the frame 331. An electromagnetic coil 336 is arranged around the stator 332, as shown in FIGS. 11 and 12.

A valve seat 338 and a second spring 340 are provided in the passage 335 of the stator 332. The valve seat 338 has a passage 346 within the same and a sealing member 339 in its outer peripheral surface. The sealing member 339 is adapted to maintain liquid tightness between the valve seat 338 and the stator 332. The valve seat 338 is slidable within the passage 335 of the stator 332 while maintaining a liquid seal with respect to the stator 332. The second spring 340 urges the valve seat 338 upwardly in FIGS. 11 and 12. A retainer 341 of non-magnetic material operating as a positioning member is fixedly mounted on an upper end portion of the stator 332. Thus, the valve seat 338 is urged by the second spring 340 into contact with the retainer 341, whereby an upward movement thereof is stopped.

An armature 342, which can be attracted toward the stator 332 by electromagnetic force, and a member 343 are contained in a space between the stator 332 and the frame 331. A flange portion 343a of the member 343 is fixedly press-fitted with the armature 342, whereby the armature 342 and the member 343 are integrally moved. The member 343 has a globe valve portion 344 which is brought into contact with the valve seat 338 to close the passage 346. The armature 342 is guided to slide by a bore surface of the guide ring 337.

A first spring 345 is located between the flange portion 343a of the member 343 and the retainer 341 which is fixed to the upper end portion of the stator 332. The first spring 345 urges the member 343 and the armature 342 to separate the same from the stator 332.

The distance of movement of the member 343 to be in contact with the valve seat 338 in the energized state is made smaller than a distance of movement of the armature 342 which is attracted by the stator 332. FIG. 11 shows a state in which the coil 336 is not energized, and FIG. 12 shows a state in which the coil 336 is energized.

When the coil 336 is not energized as shown in FIG. 11, the member 343 and the armature 342 are moved upwardly by a force of the first spring 345. The member 343 and the armature 342 are thus upwardly moved until the upper end portion of the member 343 contacts the frame 331. In the state as shown in FIG. 11, the globe valve portion 344 of the member 343 is in a position separate from the valve seat 338. Thus, in the deenergized state as shown in FIG. 11, a flow of fluid from the master cylinder to each wheel brake is allowed and a reverse flow, i.e., flow from each wheel to the master cylinder is also allowed.

On the other hand, when the coil 336 is energized as shown in FIG. 12, the armature 342 is attracted and moves toward the stator 332. The armature 342 is thus moved until it contacts the retainer 341. As described above, the distance of movement of the member 343 to be in contact with the valve seat 338 in the energized state is made smaller than the distance of movement of the armature 342 which is attracted by the stator 332. Thus, the member 343 is first brought into contact with the valve seat 338 to close the passage 346 during movement of the armature 342. Upon further movement of the armature 342, the member 343 urges the valve seat 338 downwardly in FIGS. 11 and 12 against a force of the second spring 340, thereby closing the valve against fluid flow from ports 333, 334 to port 335. Thus, the valve seat 338 is separated from the retainer 341 by a distance Δl in the energized as shown in FIG. 12.

In the state as shown in FIG. 12, in which the magnetic coil is energized a flow of the fluid from the passage 335 to the ports 333 and 334 is prevented. On the other hand, a flow of the fluid from the ports 333 and 334 to the passage 335 is allowed when hydraulic pressure acting on the effective sealing areas of the member 343 and the valve seat 338 urges the valve seat 338 in a valve-opening direction and the hydraulic pressure exceeds the spring force of the second spring 340.

Thus, the electromagnetic directional control valve 330 as shown in FIGS. 11 and 12 allows a bidirectional flow of the fluid in the deenergized state. Further, the same allows unidirectional flow of the fluid while preventing a reverse flow of the fluid upon being deenergized.

Further, the electromagnetic directional control valve 330 as shown in FIGS. 11 and 12 does not cause any such problem as has occurred in the electromagnetic directional control valve as shown in FIGS. 10A and 10B. It is assumed here that the passage 335 side is at a high pressure level and the ports 333 and 334 are at low pressure levels in the energized state as shown in FIG. 12. In this case, fluid pressure acting on a sealing effective area between the member 343 and the valve seat 338 urges the member 343 in the valve-opening direction. Therefore, when the electromagnetic directional control valve 330 is deenergized, the member 343 is subjected to an urging force by the fluid pressure in addition to the spring force by the first spring 345, to be immediately moved to a valve-opening position. Thus, the electromagnetic directional control valve 330 as shown in FIGS. 11 and 12, can attain a quick response for changing from the energized state to the non-energized state.

Further, the force of the first spring 345 need not be increased to attain a quick response in the deenergized state. Thus, a quick response can be attained also when changing from the deenergized state to the energized state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electromagnetic control valve, comprising housing means (201, 202) for enclosing said valve, a fluid flow passage in said housing means, first port means (203, 204) and second port means (205) in said housing means for permitting fluid flow through said fluid flow passage, a fixed valve seat (208) in said fluid flow passage in said housing means, a movable valve member (210) arranged in said fluid flow passage for cooperation with said fixed valve seat (208) for closing and opening said fluid flow passage, electromagnet means (207) including an armature (211) movable in said housing means in response to energizing and deenergizing said electromagnet means, said movable valve member being arranged inside said armature, first spring means (213) arranged for continuously urging said movable valve member in a direction toward said fixed valve seat (208), second spring means (214) arranged for continuously urging said armature (211) in a direction away from said fixed valve seat, said first spring means having a first spring force smaller than a second spring force of said second spring means, said movable valve member (210) in said armature (211), and said first and second spring means (213, 214) being so dimensioned and arranged that a displacement ($l_2$) of said armature is larger than a displacement ($l_1$) of said movable valve member so that a bidirectional fluid flow from said first port means to said second port means and vice versa is permitted when said electromagnet means are deenergized while permitting only a unidirectional fluid flow from said second port means (205) to said first port means (203, 204) when said electromagnet means are energized.

2. The valve of claim 1, wherein said armature (211) comprises a ring cylinder, said fluid flow passage extending through said ring cylinder, a radially inwardly reaching ring shoulder forming part of said armature ring cylinder, said second spring means (214) bearing against said ring shoulder and against a shoulder of said valve seat (208) for urging said armature (211) away from said valve seat (208), said movable valve member (210) having a radially outwardly reaching ring flange inside said armature ring cylinder, said ring flange having at least one bore therein forming part of said fluid flow passage, said ring flange resting on said armature ring shoulder, said first spring means (213) bearing against said ring flange and against said housing means for assuring that said movable valve body, said armature, and said first and second spring means cooperate with one another for permitting said bidirectional flow and said unidirectional flow.

3. An electromagnetic control valve, comprising housing means (331, 332) for enclosing said valve, a fluid flow passage in said housing means, first port means (333, 334) and second port means (335) in said housing means for permitting fluid flow through said fluid flow passage, a slidable valve seat (338) positioned in said housing means and having a flow channel forming part of said fluid flow passage, a movable valve member (343) arranged in said fluid flow passage for cooperation with said slidable valve seat (338) for closing and opening said fluid flow passage, electromagnet means (336) including an armature (342) rigidly connected to said movable valve member (343) for moving said movable valve member (343) into contact with said slidable valve seat (338) in response to energizing said electromagnet means (336), first spring means (345) arranged for urging said armature (342) in a valve opening direction, second spring means (340) arranged for urging said slidable valve seat (338) toward said movable valve member (343), positioning means (341) located in a fixed position in said housing means for limiting a sliding movement of said slidable valve seat (338) toward said movable valve member (343) under a force of said second spring means (340) when said electromagnet means are deenergized, said movable valve member (343) and said armature (342) being so positioned relative to each other that in response to energizing said electromagnet means, said movable valve member (343) must traverse a smaller distance for contacting said slidable valve seat than the distance traversed by said armature for contacting said positioning means, whereby said movable valve member (343) and said armature (342) cooperate with said first and second spring means and with said slidable valve seat in permitting a bidirectional fluid flow from said first port means to said second port means and vice versa when said electromagnet means are deenergized while permitting only a unidirectional fluid flow from said second port means to said first port means when said electromagnet means are energized.

4. The valve of claim 3, wherein one end of said first spring means (345) bears against said movable valve body and said armature while an opposite end of said first spring means bear against said positioning means, and wherein one end of said second spring means (340) bears against said slidable valve seat (338) while an opposite end of said second spring means bears against said housing means.

5. The valve of claim 3, wherein said movable valve member (343) has a flange portion (343a) with at least one fluid flow bore therethrough, said flange portion being received with a press-fit inside said armature (342) whereby said movable valve member (343) and said armature (342) extend coaxially to each other.

6. The valve of claim 5, wherein said armature has a radially inwardly facing shoulder, said flange portion of said movable valve member resting against said shoulder.

* * * * *

UNITED STATES PATENT AND TRADEMARK OFFICE
CERTIFICATE OF CORRECTION

PATENT NO. : 4,898,434
DATED : February 6, 1990
INVENTOR(S) : Teruhisa Kohno

It is certified that error appears in the above-identified patent and that said Letters Patent is hereby corrected as shown below:

On the title page:
In the line directly under "United States Patent [19]" please delete "et al.".

The line [75] should be changed to read:
--Inventor: Teruhisa Kohno, Hyogo, Japan--.

Signed and Sealed this

Eighteenth Day of June, 1991

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,898,434
DATED : February 6, 1990
INVENTOR(S) : Teruhisa Kohno

Page 2 of 3

It is certified that error appears in the above-identified patent and that said Letters Patent is hereby corrected as shown below:

Column 1, lines 3 and 4 (actual line count) please delete these lines and insert instead --This is a Divisional of application Ser. No. 349,930 (pending) filed May 9, 1989 which is a FWC of Ser. No. 115,450, (abandoned) filed Oct. 30, 1987.--

Column 10, line 62, replace "member 210" by --movable valve member 210--;

Column 10, line 63, replace "member" by --movable valve member--;

Column 11, line 7, line 8, line 13, line 23, line 24, line 26, replace "member 210" by --movable valve member 210--;

Column 11, line 28, replace "member" by --movable valve member--;

UNITED STATES PATENT AND TRADEMARK OFFICE
CERTIFICATE OF CORRECTION

PATENT NO. : 4,898,434

DATED : February 6, 1990

INVENTOR(S) : Teruhisa Kohno

Page 3 of 3

It is certified that error appears in the above-identified patent and that said Letters Patent is hereby corrected as shown below:

Column 11, line 39, line 40, line 43, line 62, line 68,
       replace "member 210" by --movable valve member 210--;

Column 12, line 2, line 5, line 6, line 9, line 10, replace
       "member 210" by --movable valve member 210--;

Column 12, line 60, line 62, line 64, line 65, replace
       "member 343" by --movable valve member 343--;

Column 13, line 2, line 4, line 6, line 13, replace "member 343"
       by --movable valve member 343--;

Column 13, line 14, replace "member" by --movable valve member--;

Column 13, line 16, line 18, line 28, line 32, line 35,
       replace "member 343" by --movable valve member 343--;

Column 13, line 36, delete "in Figs. 11 and 12";

Column 13, line 46, replace "member" by --movable valve member--

Column 13, line 64, line 65, line 67, replace "member 343"
       by --movable valve member 343--.